US012809600B2

(12) United States Patent
Ozeki

(10) Patent No.: US 12,809,600 B2
(45) Date of Patent: Nov. 24, 2026

(54) SCREEN CREATION DEVICE, AND COMPUTER-READABLE STORAGE MEDIUM

(71) Applicant: Fanuc Corporation, Minamitsuru-gun (JP)

(72) Inventor: Shinichi Ozeki, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 345 days.

(21) Appl. No.: 18/567,182

(22) PCT Filed: Jun. 22, 2021

(86) PCT No.: PCT/JP2021/023676
§ 371 (c)(1),
(2) Date: Dec. 5, 2023

(87) PCT Pub. No.: WO2022/269775
PCT Pub. Date: Dec. 29, 2022

(65) Prior Publication Data
US 2024/0272608 A1 Aug. 15, 2024

(51) Int. Cl.
*G06F 8/38* (2018.01)
*G05B 19/409* (2006.01)

(52) U.S. Cl.
CPC .............. *G06F 8/38* (2013.01); *G05B 19/409* (2013.01); *G05B 2219/32128* (2013.01)

(58) Field of Classification Search
CPC .......... G06F 3/0481; G06F 8/38; G06F 9/451; G05B 19/409
See application file for complete search history.

(56) References Cited

U.S. PATENT DOCUMENTS 5,465,215 A * 11/1995 Strickland ............ G05B 19/409 700/86
11,061,383 B1 * 7/2021 Rodgers .............. G06F 3/04817
(Continued)

FOREIGN PATENT DOCUMENTS

JP 2002-268711 A 9/2002
JP 2003-050698 A 2/2003
(Continued)

OTHER PUBLICATIONS

International Search Report and Written Opinion for International Application No. PCT/JP2021/023676, dated Sep. 21, 2021, 5 pages.
(Continued)

*Primary Examiner* — Mong-Shune Chung
(74) *Attorney, Agent, or Firm* — BUCHANAN INGERSOLL & ROONEY PC

(57) ABSTRACT

A screen creation device, which supports the creation of a user interface screen for a numerical controller, is provided with a part library that stores parts to be placed on the user interface screen and composite parts that are combinations of a plurality of parts. The screen creation device: acquires mechanical information about a machine tool to be controlled by the numerical controller; determines composite parts that can be used on the user interface screen based on the mechanical information about the machine tool; presents the usable composite parts to a user; and accepts the placement of the usable composite parts onto the user interface screen.

6 Claims, 10 Drawing Sheets

AVAILABLE PART CORRESPONDENCE TABLE

18

| MAJOR CATEGORY (TYPE OF MACHINE TOOL) | INTERMEDIATE CATEGORY (TYPE OF MACHINE TOOL) | MINOR CATEGORY (MACHINE CONFIGURATION) | AVAILABLE COMPOSITE PART |
|---|---|---|---|
| CUTTING MACHINE | LATHE | NUMBER OF AXES | |
| | MACHINING | NUMBER OF TOOLS RECEIVED | |
| | MULTITASKING MACHINE | NUMBER OF WORKPIECE COORDINATE SETS | |
| | ⋮ | ⋮ | ⋮ |
| WIRE-CUT ELECTRIC DISCHARGE | ⋮ | ⋮ | ⋮ |
| INJECTION MOLDING | ⋮ | ⋮ | ⋮ |
| ⋮ | ⋮ | ⋮ | ⋮ |

(56) References Cited

U.S. PATENT DOCUMENTS

| | | | | |
|---|---|---|---|---|
| 2013/0338815 | A1* | 12/2013 | Ogawa | G05B 19/18 700/180 |
| 2017/0109005 | A1* | 4/2017 | Adachi | G06F 3/0482 |
| 2020/0073542 | A1* | 3/2020 | Sato | G06F 3/0482 |
| 2020/0272126 | A1* | 8/2020 | Oonishi | G06F 9/451 |

FOREIGN PATENT DOCUMENTS

| | | | | | |
|---|---|---|---|---|---|
| JP | 2004126956 | A | | 4/2004 | |
| JP | 2008171318 | A | | 7/2008 | |
| JP | 2012088791 | A | | 5/2012 | |
| JP | 2017-076320 | A | | 4/2017 | |
| JP | 2020035162 | A | | 3/2020 | |
| JP | 2020135820 | A | * | 8/2020 | G05B 19/4155 |

OTHER PUBLICATIONS

Notice of Allowance (Decision to Grant a Patent) issued Dec. 10, 2024, by the Japan Patent Office in corresponding Japanese Patent Application No. 2023-529294 and an English translation of the Notice of Allowance. (5 pages).

* cited by examiner

FIG.6

AVAILABLE PART CORRESPONDENCE TABLE

18

| MAJOR CATEGORY (TYPE OF MACHINE TOOL) | INTERMEDIATE CATEGORY (TYPE OF MACHINE TOOL) | MINOR CATEGORY (MACHINE CONFIGURATION) | AVAILABLE COMPOSITE PART |
|---|---|---|---|
| CUTTING MACHINE | LATHE | NUMBER OF AXES | |
| | MACHINING | NUMBER OF TOOLS RECEIVED | |
| | MULTITASKING MACHINE | NUMBER OF WORKPIECE COORDINATE SETS | |
| | ⋮ | ⋮ | ⋮ |
| WIRE-CUT ELECTRIC DISCHARGE | ⋮ | ⋮ | ⋮ |
| INJECTION MOLDING | ⋮ | ⋮ | ⋮ |
| ⋮ | ⋮ | ⋮ | ⋮ |

FIG.7

EXECUTION FUNCTION CORRESPONDENCE TABLE

19

| MAJOR CATEGORY (TYPE OF MACHINE TOOL) | AVAILABLE COMPOSITE PART | INTERMEDIATE CATEGORY (TYPE OF MACHINE TOOL) | AVAILABLE EXECUTION FUNCTION |
|---|---|---|---|
| CUTTING MACHINE | TOOL LIST PART | LATHE | MEASUREMENT INPUT |
| | ⋮ | ⋮ | ⋮ |
| | | MACHINING | |
| | ⋮ | ⋮ | ⋮ |
| | WORKPIECE COORDINATE LIST PART | LATHE | |
| | ⋮ | ⋮ | ⋮ |
| | PROGRAM EDITING PART | MACHINING | |
| | ⋮ | ⋮ | ⋮ |
| WIRE-CUT ELECTRIC DISCHARGE | COORDINATE DISPLAY PART | | |
| | DISCHARGE OUTPUT SETTING PART | | |
| | ⋮ | ⋮ | ⋮ |
| INJECTION MOLDING | PRESSURE-MAINTAINING SETTING PART | | |
| | COOLING SPEED SETTING PART | | |
| | ⋮ | ⋮ | ⋮ |
| ⋮ | ⋮ | ⋮ | ⋮ |

FIG.8
WORKPIECE COORDINATE TABLE PART
| | X | Y | Z |
|---|---|---|---|
| G54 | 10.0000 | 10.0000 | 10.000 |
| G55 | 0.0000 | 0.0000 | 0.024 |
| G56 | 0.0000 | 109.8897 | 0.000 |
| G57 | 0.1124 | 0.0000 | 0.000 |
| G58 | 0.0000 | 0.0000 | 0.000 |
| G59 | 0.0000 | 0.0000 | 0.000 |
OPERATION (EXECUTION FUNCTION)
WORKPIECE EDGE FACE MEASUREMENT FUNCTION
```
double edge_measure_func( )
{
    .
    .
    .
}
```
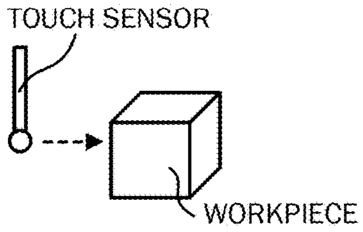
WORKPIECE CIRCULAR SHAPE MEASUREMENT FUNCTION
```
double circle_measure_func( )
{
    .
    .
    .
}
```
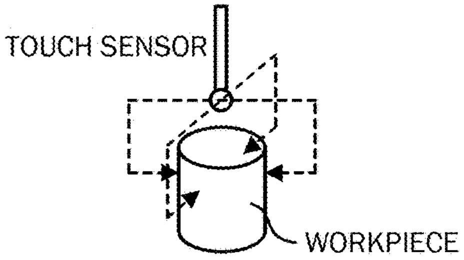

SCREEN CREATION DEVICE, AND COMPUTER-READABLE STORAGE MEDIUM

CROSS REFERENCE TO RELATED APPLICATIONS

This is the U.S. National Phase application of PCT/JP2021/023676, filed Jun. 22, 2021, the disclosures of this application being incorporated herein by reference in its entirety for all purposes.

FIELD OF THE INVENTION

The present invention relates to a screen creation device and a computer-readable storage medium.

BACKGROUND OF THE INVENTION

A numerical controller is a machine that controls a machine tool. The numerical controller is provided with a user interface screen (referred to as a UI screen). The UI screen displays a state of the machine tool and receives input by an operator.

Examples of a control target of the numerical controller include a lathe, a drilling machine, a boring machine, a milling machine, a grinding machine, a machining center, a turning center, and an electric discharge machine. A developer of the UI screen creates the UI screen according to a type of machine tool, a machine configuration of the machine tool, and specifications required by a user.

For example, FIG. 3 in Patent Document 1 exemplifies a display screen of a spindle load. This screen displays a state of a machine tool "automatic driving", a current time "2002/4/23 21:53:40", a graph of the spindle load, a program during execution, and screen operation buttons.

Conventionally, there has been dedicated software for creating a UI screen for a numerical controller. This software provides parts for screen creation. A developer of the UI screen arranges these parts on the UI screen, sets properties (attributes and operation contents (execution functions)) of the individual parts, and completes the UI screen.

Patent Document

Patent Document 1: JP 2004-126956 A

SUMMARY OF THE INVENTION

There is a plurality of parts to be arranged on the UI screen. However, it is difficult to determine which parts are available. In addition, there is a plurality of part operations, and it is difficult to determine which operations are available. Work for performing appropriate setting from a huge number of options is troublesome for a UI screen developer.

Techniques for simplifying creation of user interfaces are desirable in the field of numerical controllers.

A screen creation device which is an aspect of the present disclosure is a screen creation device for supporting creation of a user interface screen of a numerical controller, the screen creation device includes a part library configured to store parts arranged on the user interface screen and a composite part obtained by combining a plurality of parts, a machine information acquirer configured to acquire machine information of a machine tool serving as a control target of the numerical controller, an available part determinator configured to determine an available composite part on the user interface screen based on the machine information of the machine tool, and an editor configured to receive layout of the available composite part on the user interface screen.

A storage medium which is an aspect of the present disclosure is a storage medium storing a computer-readable instruction, the storage medium storing parts arranged on a user interface screen and a composite part obtained by combining a plurality of parts, the instruction being executed by one or a plurality of processors to acquire machine information of a machine tool controlled by a numerical controller configured to display the user interface screen, determine an available composite part on the user interface screen based on the machine information of the machine tool, and receive layout of the available composite part on the user interface screen.

According to one aspect of the invention, it is possible to simplify creation of a user interface.

BRIEF DESCRIPTION OF DRAWINGS

FIG. 6 is a diagram showing an example of an available part correspondence table;

FIG. 7 is a diagram showing an example of an execution function correspondence table;

FIG. 8 is a diagram showing an example of an execution function which is available in a workpiece coordinate table part;

A screen creation device 100 will be described below.

Figure 1:
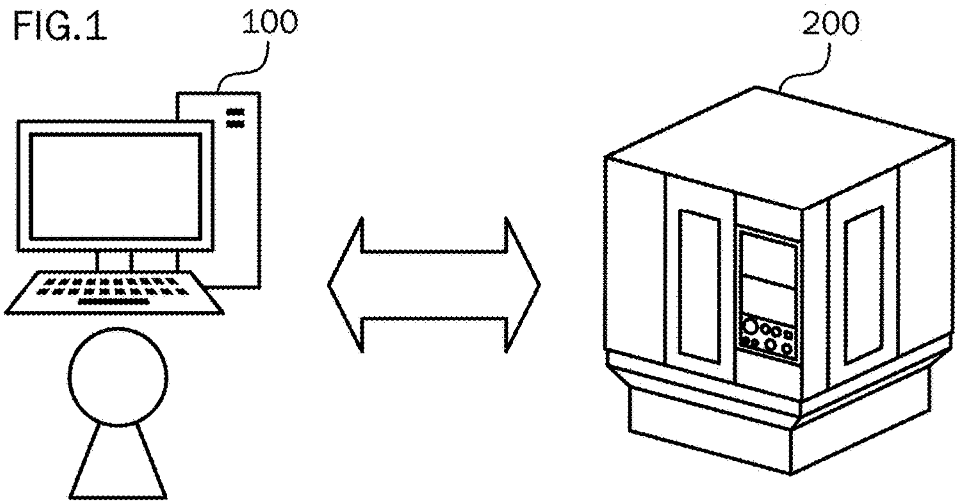
FIG. 1 is a diagram illustrating a relationship between a screen creation device and a numerical controller.

As illustrated in FIG. 1, the screen creation device 100 is installed in an information processing device such as a PC (personal computer). Dedicated software for creating an operation screen of the numerical controller 200 is installed in the screen creation device 100. A user operates software to create a UI screen. The UI screen created by the dedicated software is transferred to the numerical controller 200 and displayed on a display unit 10 of the numerical controller 200.

Figure 2:
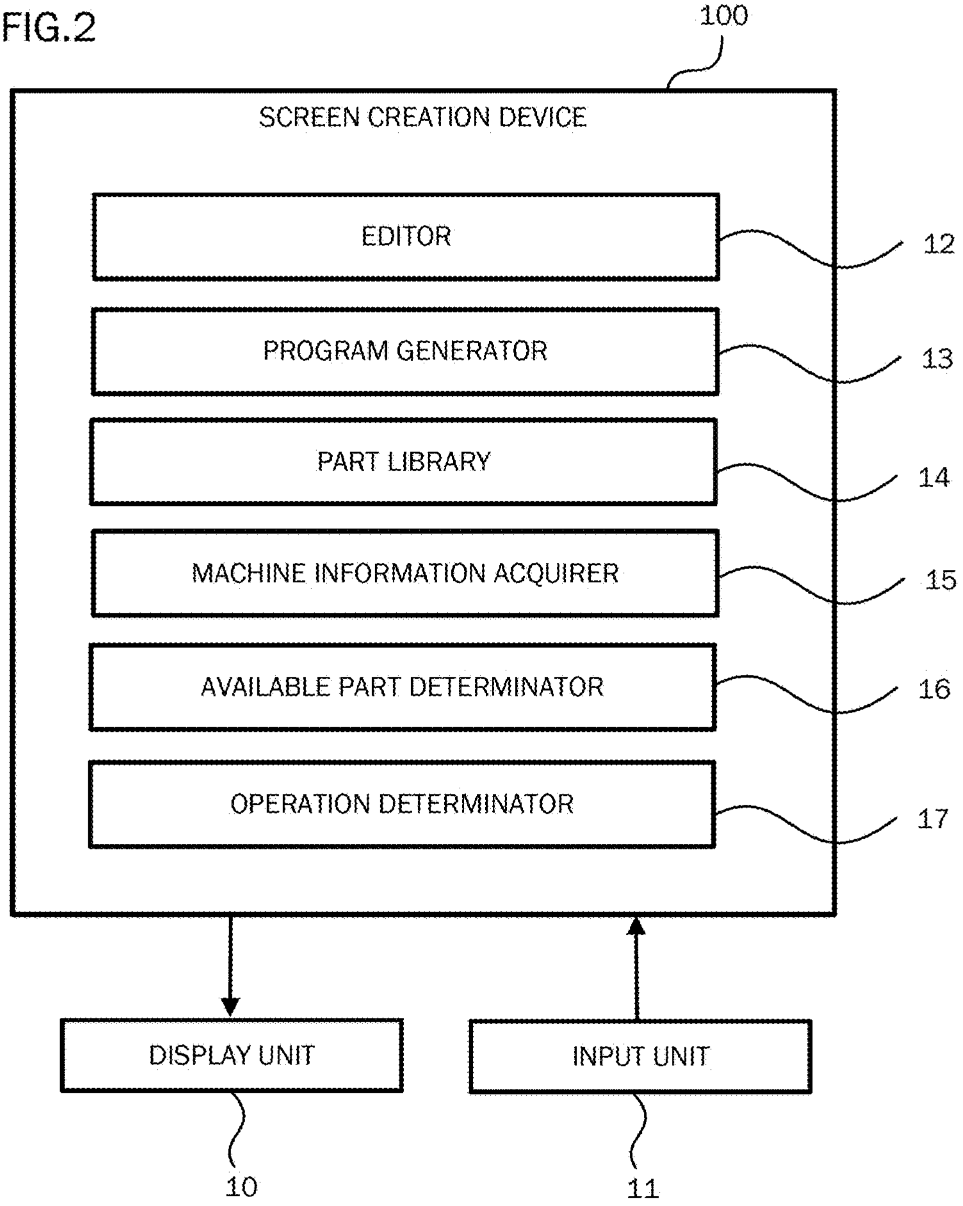
FIG. 2 is a block diagram of the screen creation device.

FIG. 2 is a block diagram of the screen creation device 100. The screen creation device 100 includes a display unit 10, an input unit 11, an editor 12, a program generator 13, a part library 14, a machine information acquirer 15, an available part determinator 16, and an operation determinator 17.

The editor 12 displays a UI editing screen 20 on the display unit 10 of the screen creation device 100 and receives an editing operation by the user. The editor 12 updates layout of the screen and the properties (attributes) of parts according to operation input by the user.

The program generator 13 converts the properties of the parts and layout of the UI screen created by the editor 12 into an executable program. The executable program is implemented in the numerical controller 200 and functions as the UI screen.

Figure 3:
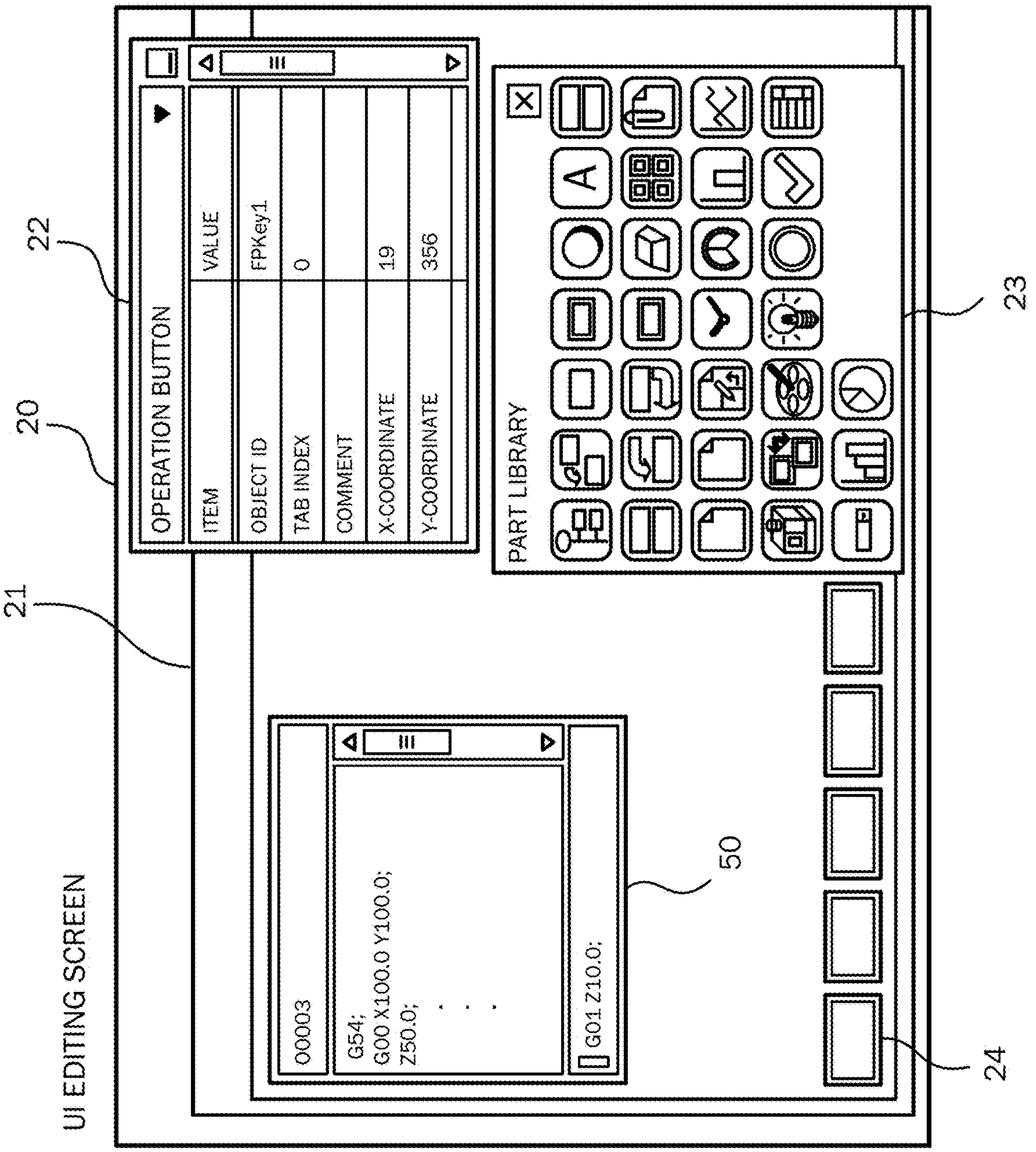
FIG. 3 is a diagram showing an example of a UI editing screen.

FIG. 3 is an example of the UI editing screen 20. The UI editing screen 20 includes a UI editing region 21, a property display region 22, and a part library display region 23. A part that can be arranged on the UI screen can be selected from the part library display region 23. Five parts (operation buttons 24) are arranged in the UI editing region 21. One of five parts is in a selected state. A property of the selected part is displayed in the property display region 22.

In the property display region 22, information related to a part can be set, the information related to the part including visual information such as a size, a shape, or coordinates of the part, a label such as a numerical value, an icon, or a letter string, and a type of part, a name of the part, and operation content (execution function) of the part.

The part library 14 stores parts on the UI screen. The parts include a single part and a composite part 50. The single part indicates a stand-alone component. The single part includes the operation button 24, a key input button, a label, etc. However, the invention is not limited thereto.

The composite part 50 indicates a part obtained by combining a plurality of single parts.

Figure 4:
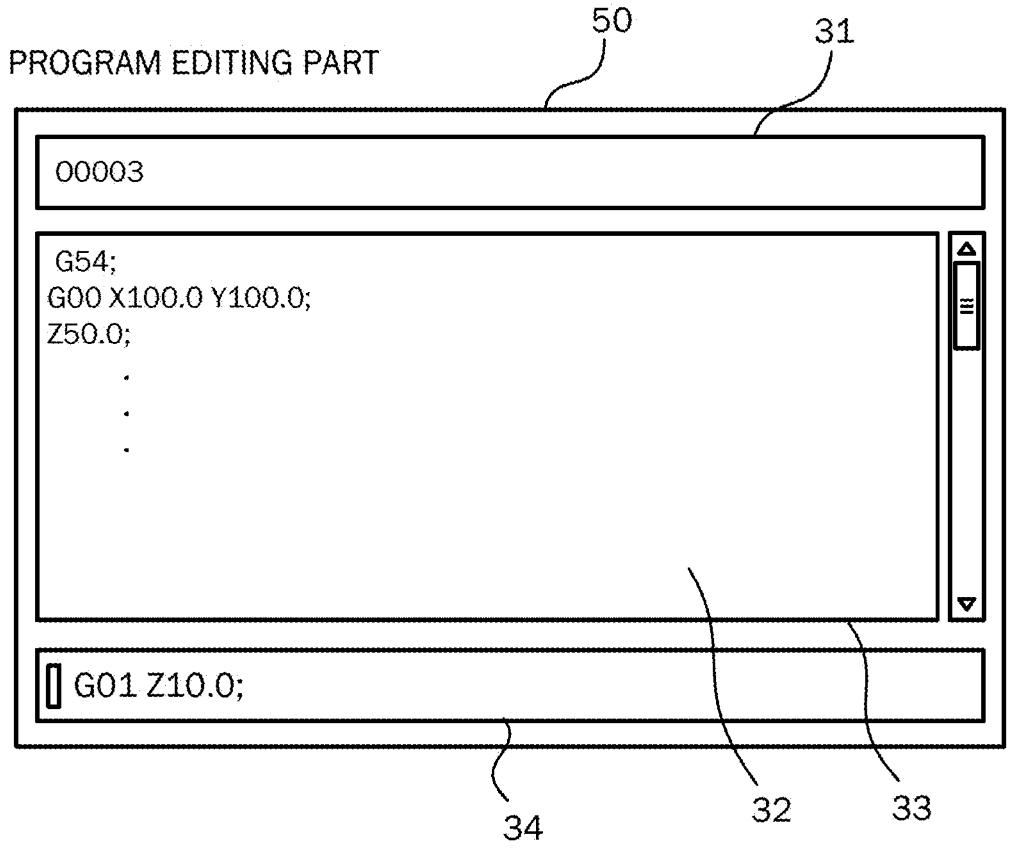
FIG. 4 is a diagram illustrating a relationship between a composite part and single parts.

For example, the composite part 50 (program editing part) in FIG. 4 is composed of a plurality of single parts (a label display part 31, a figure display part 32, a multi-line letter string display part 33, and an input reception part 34). The label display part 31 is a part that displays a letter string. Here, a program name "00003" is displayed. The figure display part 32 is a part used for screen design. Here, it is a blue background. The multi-line letter string display part 33 is a part that displays a plurality of letter strings. Here, a machining program is displayed in the multi-line letter string display part 33. The input reception part 34 receives input of a letter string to be edited. By pressing an "Enter" key, a letter string input to the input reception part 34 is reflected in the multi-line letter string display part 33.

Figure 5:
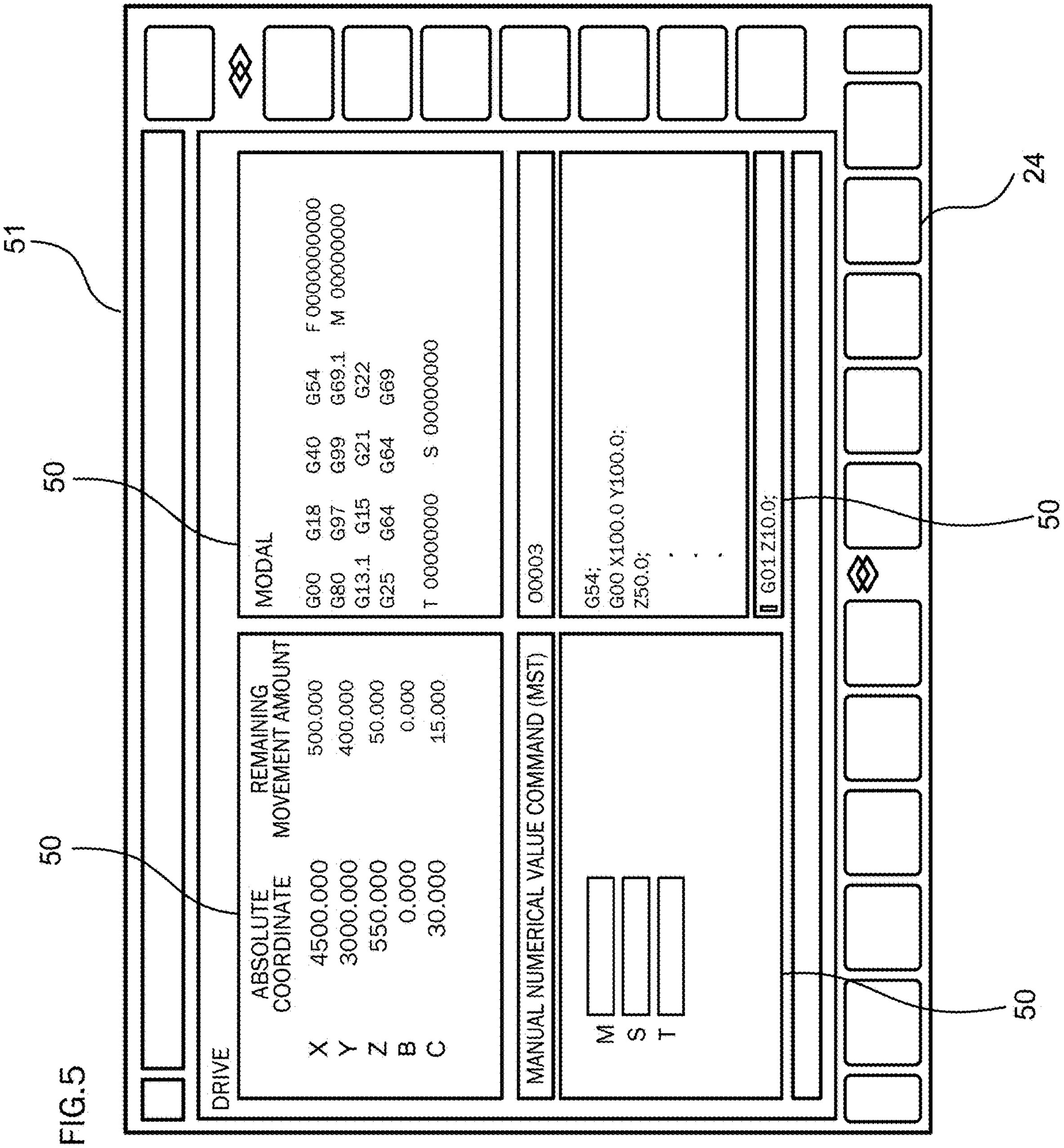
FIG. 5 is a diagram showing an example of a UI screen on which composite parts are arranged.

With reference to FIG. 5, a UI screen on which composite parts 50 are arranged will be described. In FIG. 5, a base part 51 and the composite parts 50 are arranged in a UI editing region 21. As illustrated in FIG. 5, operation buttons 24 for operating the UI screen are lined up in the region of the lower portion and the right portion of the base component 51. The composite parts 50 and single parts can be arranged in a central region of the base part 51.

In FIG. 5, four composite parts 50 (a coordinate display part, an information display part, a manual numerical value command input part, and a program display part) are arranged in the base part 51.

The machine information acquirer 15 acquires machine information of the machine tool. The machine information may be directly input to the screen creation device 100 by the user or may be determined from parameters or option information set in the numerical controller 200.

The available part determinator 16 determines a composite part 50 available for an operation of the machine tool. The available part determinator 16 has an available part correspondence table 18 as shown in FIG. 6. The available part correspondence table 18 associates a machine category with the composite part 50. The available part correspondence table 18 in FIG. 6 has items of "major category", "intermediate category", and "minor category". The "major category" and the "intermediate category" are categories according to a type of machine tool. Examples of the "major category" include "cutting machine", "wire-cut electric discharge machine", and "injection molding". The "intermediate category" is a more subdivided category than the "major category". The major category "cutting machine" in FIG. 6 is divided into items such as intermediate categories "lathe", "machining center", and "multitasking machine". The "minor category" is obtained by subdividing the "intermediate category" according to a machine configuration. Examples of the "minor category" include items such as "number of axes", "number of tools received", and "number of workpiece coordinate sets". In this way, a category of the machine tool is associated with a composite part 50 available in the machine tool.

The available part determinator 16 determines whether or not a composite part is available based on the machine information and the available part correspondence table 18. Examples of determination include determination based only on the "major category", determination based on the "intermediate category", and determination based on even the "minor category". For example, "injection pressure", "injection volume", et cetera, are displayed on a composite screen for monitoring an operation state of an "injection molding machine". However, such a composite screen is not used for the "cutting machine" or the "wire-cut electric discharge machine". The available part determinator 16 determines an available composite part 50 from the type of machine tool.

The editor 12 has a mechanism for restricting use of an unavailable composite part 50. For example, the editor 12 notifies the user with a warning sound or a warning image, grays out display of the unavailable composite part 50, or hides the unavailable composite part 50.

The operation determinator 17 determines an operation (execution function) that can be used by the composite part 50 based on the "intermediate category" and the "minor category" of the machine tool. FIG. 7 is an execution function correspondence table 19 that associates the "intermediate category" of the machine tool with available operations (execution functions). A composite part 50 corresponding to the "major category" is associated with operations (execution functions) corresponding to "intermediate category".

In major category "cutting machine", even in an available composite part 50, "valid operations (execution functions)" and "invalid operations (execution functions)" occur depending on whether a machine tool to be operated is a lathe or a machining center. For example, a workpiece coordinate table part is a composite part 50 that is available in the cutting machine. In the machining center or the lathe included in the cutting machine, the workpiece coordinate table part is available.

However, execution functions "edge_measure_func (workpiece edge face measurement function)" and "circle_measure_func (workpiece circular shape measurement function)" illustrated in FIG. 8 are available in the machining center, but are unavailable in the lathe due to structure of the lathe. In this way, even when a composite part 50 is available in the "major category", some execution functions are unavailable considering the "intermediate category" or the "minor category".

The editor 12 has a mechanism for restricting use of an unavailable operation (execution function).

Figure 9:
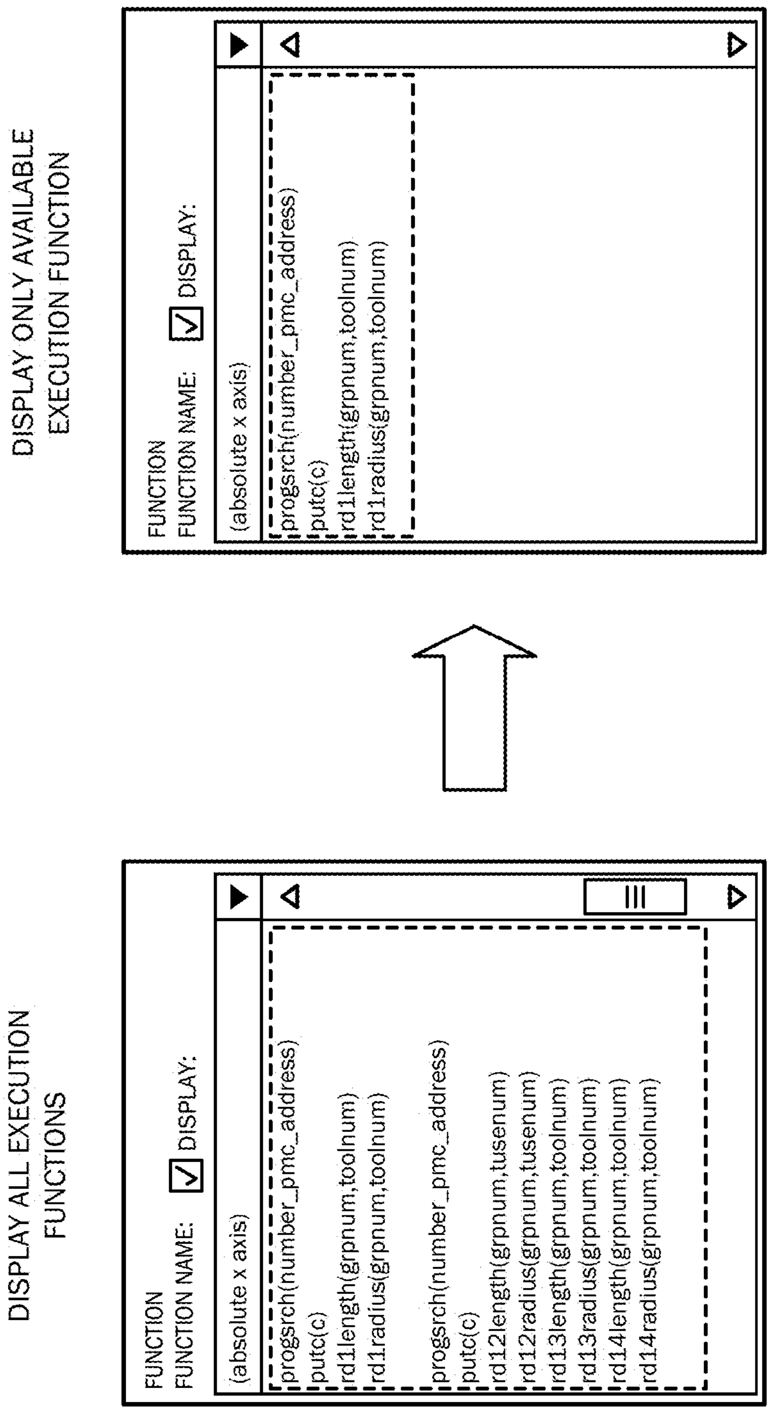
FIG. 9 is a diagram showing a display example of an execution function list.

A left diagram in FIG. 9 displays all execution functions, and a right diagram of FIG. 9 displays only available functions for a machine tool serving as a control target. When only available operations (execution functions) are displayed, the number of displayed operations (execution functions) decreases, and it becomes easier to search for an operation (execution function).

Note that a method of displaying available operations (execution function) is not limited to the above description. Unavailable operations (execution functions) may be grayed out, or unavailable operations (execution functions) may be prevented from being selected.

Figure 10:
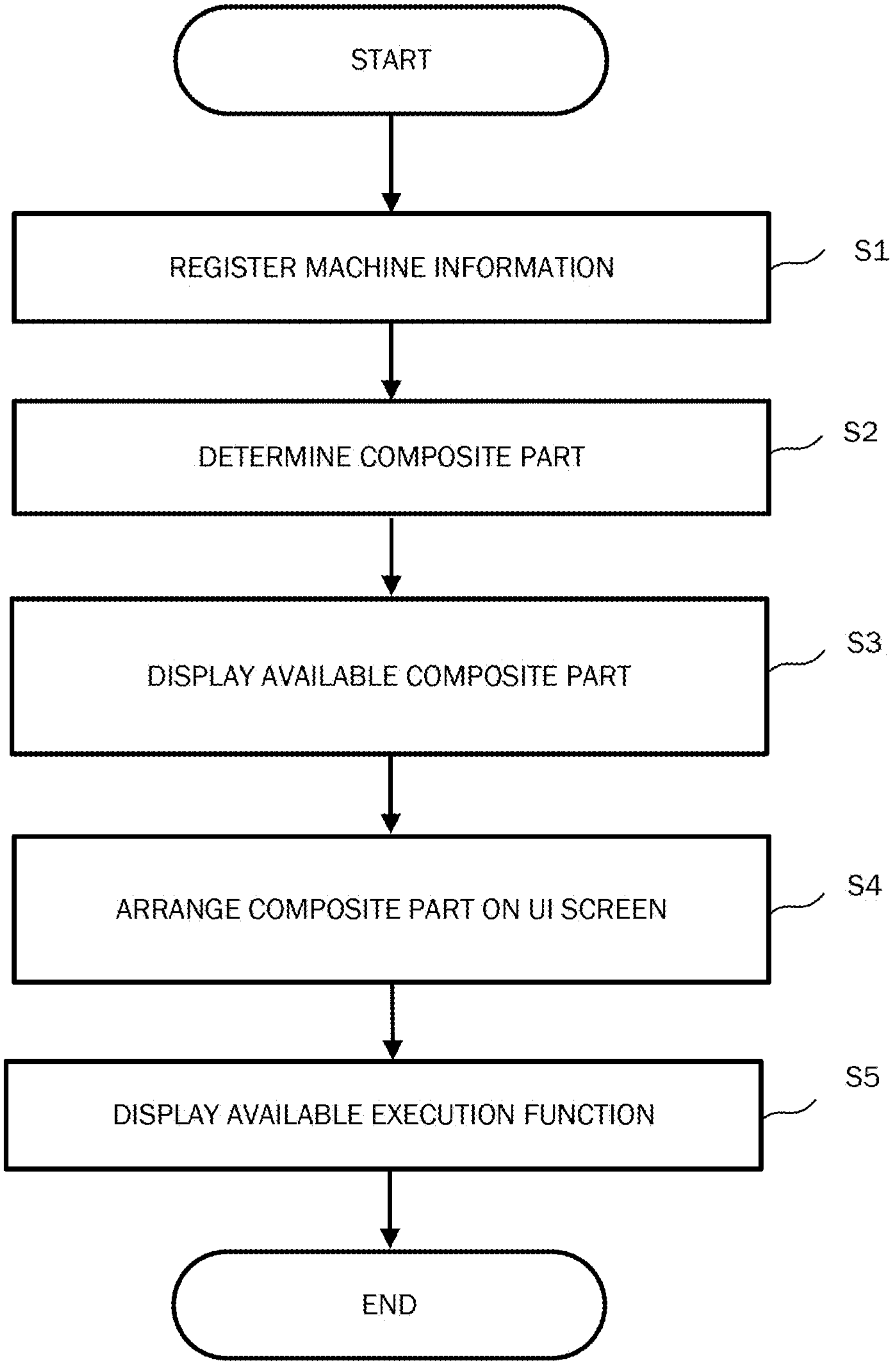
FIG. 10 is a flowchart for illustrating an operation of the screen creation device.

FIG. 10 is a flowchart for illustrating an operation of the screen creation device 100.

Machine information is registered in the screen creation device 100 (step S1). The machine information may be directly input to the screen creation device 100 by the user or may be determined from parameters and option states set in the numerical controller 200.

The screen creation device 100 determines a composite part 50 that is available in an operation of the machine tool based on the machine information (step S2). Examples of determination of the composite part 50 include determination based only on "major category" of the machine information, determination based on "intermediate category", and determination based on even "minor category.

The screen creation device 100 displays the composite parts 50 that are available in the machine tool serving as a control target (step S3). To indicate whether or not the composite part 50 is available to the user, the screen creation device 100 has a mechanism for restricting use of unavailable composite parts 50. For example, the screen creation device 100 notifies the user of availability with a warning sound or a warning image, grays out display of the unavailable composite parts 50, or hides the unavailable composite parts 50.

The user selects a composite part 50 and arranges the composite part 50 in UI editing region 21 (step S4).

The screen creation device 100 displays an operation (execution function) that is available in the selected composite part 50 based on the machine information (step S5). The screen creation device 100 has a mechanism for restricting use of unavailable operations (execution functions). For example, the screen creation device 100 notifies the user of availability with a warning sound or a warning image, grays out display of the unavailable operations (execution functions), or hides the unavailable operations (execution functions).

The screen creation device 100 of the disclosure provides a composite part 50 created according to a specific purpose of use. The machine information of the machine tool is classified into "major category", "intermediate category", and "minor category", and classification of the machine tool is associated with the composite part 50 that is available in each machine tool. The screen creation device 100 acquires the machine information of the machine tool serving as the control target, determines the unavailable composite parts 50, and restricts use of the unavailable composite parts 50. In this way, selection of the composite part 50 is facilitated, and creation of the UI screen is facilitated.

The screen creation device 100 of the disclosure associates classification of the machine information of the machine tool with the operation (execution function) that is available in each composite part 50. The screen creation device 100 determines the operation (execution function) that is available in each composite part 50 based on the machine information of the machine tool serving as the control target, and restricts use of the unavailable composite parts 50. In this way, selection of the operation (execution function) is facilitated, and creation of the UI screen is facilitated.

Note that the disclosure is an example and that modifications and improvements based on the gist of the disclosure are included in the disclosure. For example, in the screen creation device 100 of the disclosure, machine information is classified into "major category", "minor category", and "intermediate category". However, a classification method is not limited thereto. In addition, the machine information may be used as additional information of the composite part 50 instead of being separately stored as a table.

[Hardware Configuration]

Figure 11:
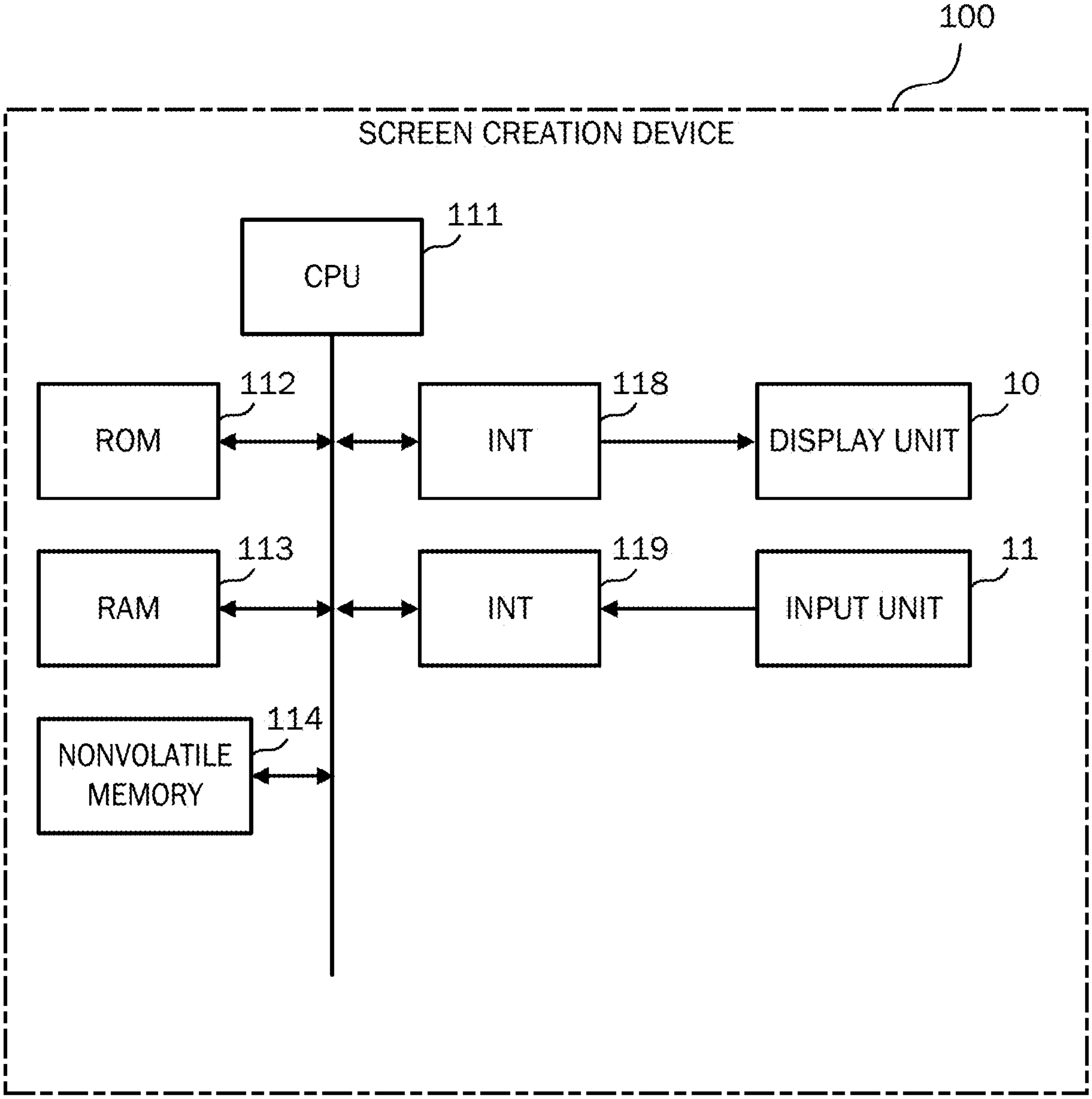
FIG. 11 is a diagram illustrating a hardware configuration of the screen creation device.

The screen creation device 100 of the disclosure has a hardware configuration illustrated in FIG. 11.

The hardware configuration of the screen creation device 100 will be described with reference to FIG. 11. A CPU 111 included in the screen creation device 100 is a processor for controlling the entire numerical controller 200. The CPU 111 reads a system program processed in a ROM 112 via a bus and controls the entire screen creation device 100 according to the system program. Temporary calculation data or display data, various data input by the user via an input unit 11, and the likeon are temporarily stored in a RAM 113.

The display unit 10 is, for example, a monitor attached to the screen creation device 100. The display unit 10 displays an operation screen, a setting screen, et cetera, of the screen creation device 100.

The input unit 11 is integrated with the display unit 10 or is a keyboard, a touch panel, et cetera, separate from the display unit 10. The user operates the input unit 11 to perform input to a screen displayed on the display unit 10, etc. Note that the display unit 10 and the input unit 11 may be mobile terminals.

A nonvolatile memory 114 may be a memory which is backed up or the like by a battery, not shown, so that a storage state is retained even when the power of the screen creation device 100 is turned off. In the nonvolatile memory 114, a program read from an external device via an interface, not shown, a program input via the input unit 11, and various data acquired from each unit of the screen creation device 100, a machine tool or the like (for example, a setting parameter or the like acquired from the machine tool) are stored. The program and the various data stored in the nonvolatile memory 114 may be loaded in the RAM 113 during execution/use. In addition, various system programs are written to the ROM 112 in advance.

EXPLANATIONS OF REFERENCE NUMERALS

- 100 SCREEN CREATION DEVICE
- 200 NUMERICAL CONTROLLER
- 10 DISPLAY UNIT
- 11 INPUT UNIT
- 12 EDITOR
- 13 PROGRAM GENERATOR
- 14 PART LIBRARY
- 15 MACHINE INFORMATION ACQUIRER
- 16 AVAILABLE PART DETERMINATOR
- 17 OPERATION DETERMINATOR
- 18 AVAILABLE PART CORRESPONDENCE TABLE
- 19 EXECUTION FUNCTION CORRESPONDENCE TABLE
- 24 OPERATION BUTTON
- 50 COMPOSITE PART
- 111 CPU
- 112 ROM
- 113 RAM
- 114 NONVOLATILE MEMORY

The invention claimed is:

1. A screen creation device for supporting creation of a user interface screen of a numerical controller, the screen creation device comprising:

a memory storing parts arranged on the user interface screen, a composite part obtained by combining a plurality of the parts, and an available part correspondence table associating machine information of a machine tool serving as a control target of the numerical controller with the composite part, and a processor configured to:

acquire the machine information of the machine tool;

determine an available composite part on the user interface screen based on the machine information of the machine tool and the available part correspondence table; and receive layout of the available composite part on the user interface screen, wherein the available part correspondence table associates a first category according to a type of machine tool and a second category obtained by subdividing the first category according to a machine configuration with the composite part.

2. The screen creation device according to claim 1, wherein the processor acquires the machine information from at least one of input from a user or information set in the numerical controller.

3. The screen creation device according to claim 1, wherein the available part determinator determines the available composite part on the user interface screen from the type of the machine tool categorized in the available part correspondence table.

4. The screen creation device according to claim 1, wherein the processor determines the available composite part on the user interface screen from the machine configuration of the machine tool categorized in the available part correspondence table.

5. The screen creation device according to claim 1, wherein the processor is further configured to:

determine an available operation in the available composite part on the user interface screen based on machine information of the machine tool, and receive setting of the available operation in the composite part.

6. A non-transitory storage medium storing a computer-readable instruction, the storage medium storing parts arranged on a user interface screen, and a composite part obtained by combining a plurality of the parts, and an available part correspondence table associating machine information of a machine tool serving as a control target of the numerical controller with the composite part, the instruction being executed by one or a plurality of processors to:

acquire machine information of the machine tool controlled by a numerical controller configured to display the user interface screen;

determine an available composite part on the user interface screen based on the machine information of the machine tool and the available part correspondence table; and receive layout of the available composite part on the user interface screen, wherein the available part correspondence table associates a first category according to a type of machine tool and a second category obtained by subdividing the first category according to a machine configuration with the composite part.

* * * * *